Aug. 21, 1945.  B. C. COONS  2,382,961
METHOD AND APPARATUS FOR PITTING FRUIT
Filed April 8, 1940   6 Sheets-Sheet 1

INVENTOR
BURTON C. COONS
BY
ATTORNEY

Aug. 21, 1945.　　　　B. C. COONS　　　　2,382,961
METHOD AND APPARATUS FOR PITTING FRUIT
Filed April 8, 1940　　　6 Sheets-Sheet 3

INVENTOR
BURTON C. COONS
BY Philip A. Minnis
ATTORNEY

Aug. 21, 1945.  B. C. COONS  2,382,961
METHOD AND APPARATUS FOR PITTING FRUIT
Filed April 8, 1940   6 Sheets-Sheet 4

FIG_11_

FIG_12_

INVENTOR
BURTON C. COONS
BY Philip A. Minnis
ATTORNEY

Aug. 21, 1945.　　　　B. C. COONS　　　　2,382,961
METHOD AND APPARATUS FOR PITTING FRUIT
Filed April 8, 1940　　6 Sheets-Sheet 6

INVENTOR
BURTON C. COONS
BY Philip A. Minnis
ATTORNEY

Patented Aug. 21, 1945

2,382,961

UNITED STATES PATENT OFFICE 2,382,961

METHOD AND APPARATUS FOR PITTING FRUIT

Burton C. Coons, San Jose, Calif., assignor to Food Machinery Corporation, San Jose, Calif., a corporation of Delaware Application April 8, 1940, Serial No. 328,479

31 Claims. (Cl. 146—19)

The present invention relates to a method and apparatus for pitting fruit, such as cherries, or the like, previous to canning or other processing of the same.

An object of the present invention is to provide a method of removing the pits of fruit and of reshaping the pitted fruit to restore the natural and attractive appearance thereof.

Another object is to provide a method of restoring the natural appearance of pitted fruit, whereby the meat of the fruit is contracted in the region of the wound left by the withdrawal of the pit and placed back into the interior of the fruit.

A further object is to provide a method of restoring the natural attractive appearance of pitted fruit whereby the opening formed in the fruit by the withdrawal of the pit is closed to form a sealed air pocket within the fruit previously occupied by the pit.

Another object of the present invention is to provide an improved apparatus for stemming and pitting of cherries, or similar fruit, in an efficient and speedy manner.

Another object is to provide an apparatus for stemming and pitting of cherries without mutilation of the fruit.

A further object of the present invention is to provide a pitting machine, having a feed mechanism including devices for stemming and centering of fruit preparatory to pitting thereof.

Another object is to provide a stemming and pitting machine comprising a reshaping mechanism for restoring the natural and attractive appearance of the fruit subsequent to the stemming and pitting thereof.

A further object of the present invention is to provide a pitting machine having a feed mechanism including devices for stemming the fruit and for centering the same preparatory to the pitting operation thereof and during suspension of the fruit on the feed mechanism.

A further object is to provide a feed mechanism comprising stemming and centering devices for stemming of fruit suspended thereon, and for centering and positioning of the same with respect to fruit supporting and holding means incident to the stemming operation.

A further object of the present invention is to provide a pitting mechanism which is automatically adjustable for removing the pits of cherries or similar fruit of various sizes.

A further object is to provide a reshaping mechanism which is automatically adjustable for reshaping stemmed and pitted fruit of various size and configuration.

A further object is to provide a fruit holding mechanism for receiving and supporting fruits in accurately centered position and for advancing the fruit through the machine, past the pitting and reshaping mechanism thereof.

A further object is to provide means for timing the operation of the pitting and reshaping mechanism relative to the operation of the feeding and fruit holding mechanism.

A further object is to provide an ejector mechanism operable in timed relation with respect to the fruit holding mechanism for discharging the pitted fruit from the machine.

Other and further objects and advantages of the present invention will become apparent from the following description taken in connection with the accompanying drawings, in which.

Figures 1, 15:
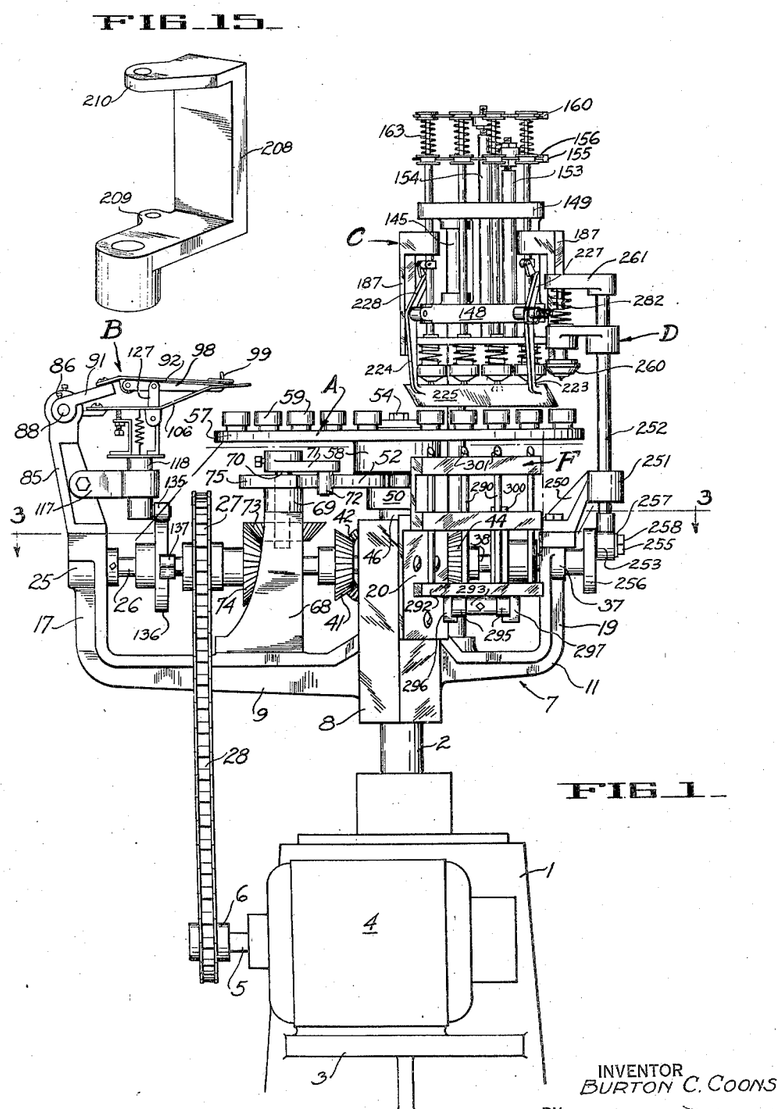
Fig. 1 is a side elevation of the machine of the present invention.
Fig. 15 is a perspective view of a bracket employed in connection with the pitting mechanism.
Figures 2, 3, 4:
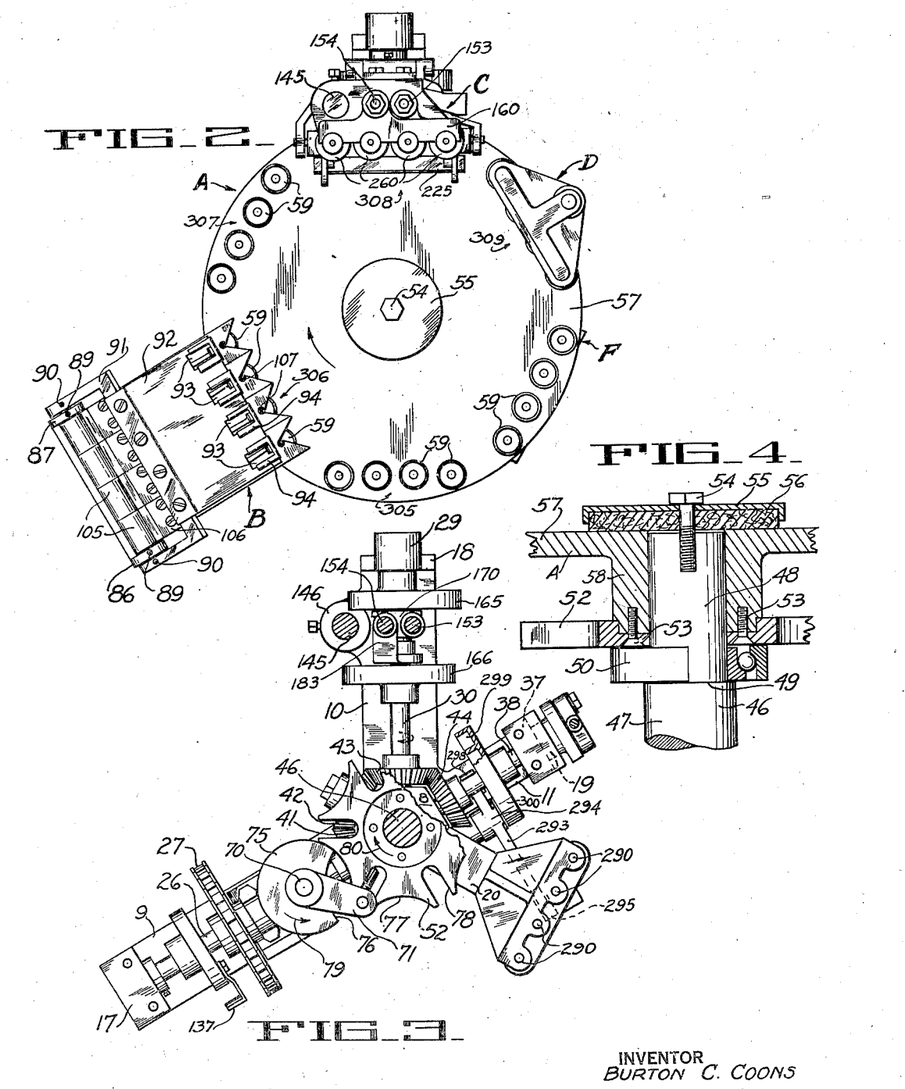
Fig. 2 is a plan view thereof.
Fig. 3 is a horizontal section of the machine, taken along lines 3—3 in Fig. 1, certain parts being broken away.
Fig. 4 is a sectional detailed view illustrating the mounting of the turret and index gear upon the standard of the machine, certain parts being shown in elevation.

Referring first briefly to the general construction of the machine of the present invention, as illustrated in Figs. 1 and 2, it may be stated that the same comprises a rotatable turret and a plurality of fruit handling and processing means positioned adjacent the same for performing various fruit preparing operations.

Primarily, the machine consists of a turret A, provided with fruit holding and supporting means, a feed mechanism B, which includes stemming and centering devices, a pitting mechanism C, a reshaping mechanism D, and an ejector mechanism F, all of which are operated in timed relation relative to each other by a single source of motive power.

The fruits which are manually inserted in the feed mechanism are stripped from the stems and centered incident to the stemming operation, and are thereupon deposited into the fruit holding and supporting means of the turret A in accurately centered position. During the rotation of the turret A, the fruit supported thereby is presented to the pitting mechanism C for removal of the pits thereof, and, subsequently, to the reshaping mechanism D for reshaping of the fruit to restore its original and attractive appearance. Finally, the turret A presents the pitted and reshaped fruit to the ejector or discharge mechanism F, which effects the discharge of the finished product from the machine.

With the foregoing description in mind, the construction and operation of the machine will now be specifically described.

Frame structure and drive

The frame structure of the machine, as may be best seen from Figs. 1 to 3, comprises a base 1 provided with a standard 2 and a supporting bracket 3, upon which an electric motor 4, provided with a drive shaft 5 and a sprocket wheel 6, is mounted in any convenient manner.

Supported upon the standard 2 and fixed with respect thereto is a spider structure 7, consisting of a hexagonal central body portion 8, and a plurality of horizontally extending spider arms 9, 10 and 11.

The spider arms 9, 10 and 11 extend in radial directions from the body portion 8 and are provided with vertically extending portions 17, 18 and 19, respectively.

The radially extending arm 9 of the spider structure 7 supports the feed mechanism B of the machine which also includes fruit stemming and centering devices. The arm 10 carries the pitting mechanism generally indicated at C, while the arm 11 supports the reshaping mechanism D of the machine.

The ejector mechanism F is likewise carried by the spider structure 7, by means of a supporting bracket 20 attached to the hexagonal body portion 8, as will be seen from Fig. 1.

The vertical portion 17 of the spider arm 9 comprises a bearing 25, within which one end of a horizontally disposed main drive shaft 26 is positioned. The other end of the shaft 26 is received within a bearing of the hexagonal body portion 8 of the spider structure 7. The main drive shaft 26 carries a sprocket wheel 27 fixed thereto, and a drive chain 28 trained around the sprocket wheels 6 and 27 is provided for imparting rotation to the shaft 26 upon operation of the motor 4.

The vertical portion 18 of the spider arm 10 comprises a bearing 29 for rotatably supporting a horizontally extending shaft 30, the other end of which is mounted within a bearing portion of the body 8 of the spider structure 7, adjacent the arm 10.

The vertical portion 19 of the arm 11 is provided with a bearing 37 which supports one end of a horizontally disposed shaft 38, supported with its other free end within a bearing in the body portion 8 of the spider structure, in a manner similar to that referred to in connection with shafts 26 and 30.

The shafts 26, 30 and 38 extend in radial directions from the hexagonal central portion 8 of the spider structure 7 in a manner similar to arms 9, 10 and 11, previously referred to.

Keyed to the shaft 26 adjacent the hexagonal body portion 8 of the spider 7 is a bevel gear 41, which is in operative engagement with an idler bevel gear 42 supported by a stud shaft extending from the portion 8 of the spider structure. The bevel gear 42 cooperates with a bevel gear 43, mounted upon the shaft 30, and the gear 43 in turn is in engagement with a bevel gear 44, fixed upon the shaft 38. From the above, it will therefore be seen that upon rotation of shaft 26, shafts 30 and 38 are correspondingly rotated to effect operation of the pitting, reshaping and ejector mechanism associated therewith.

Turret and index mechanism

The upper portion of the hexagonal member 8 of the spider 7 carries a stationary stud shaft 46 (see Fig. 4), comprising a lower portion 47 and an upper portion 48 of reduced diameter. Carried by a flange 49, formed between the stud portions 47 and 48 above referred to, is a roller bearing 50 adapted to support the turret A, and an index plate 52, interconnected therewith by means of screws 53. The turret A and index plate 52 are rotatably positioned upon the upper end 48 of the stud shaft 46, and are held in place by means of a screw 54, a metal washer 55, and a washer of resilient material 56, as clearly shown in Fig. 4.

The turret A consists of a circular table 57 provided with a hub 58, and a plurality of fruit holding and supporting cups 59, mounted upon the upper face of the table 57. These cups are arranged in series and are positioned in chords of the circle defined by the table 57. Adjacent series of fruit supporting cups 59 are disposed with respect to each other at an angle of 60 degrees, as clearly shown in Fig. 2.

Figures 18, 19, 20, 21:
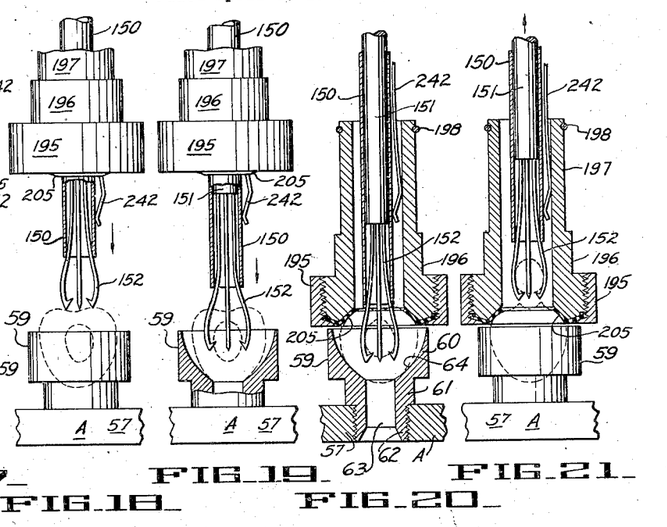

The construction of the fruit supporting cups 59 is clearly disclosed in Fig. 20, and from this illustration it will be noted that the same comprise an upper portion 60 forming a cup-like fruit receptacle, an intermediate or body portion 61, and a threaded portion 62 for removably securing the cups to the table 57.

The cups 59 are further provided with a central bore 63 extending vertically through the body portion thereof for purposes referred to hereinafter.

The interior or dished portion 64 of the cups 59 is sufficiently large to accommodate cherries of various size, and is of such a configuration that the cherries placed therein in centered position will remain in such position during the rotation of the turret A. In other words, the fruit receiving portion 64 of the cups 59 is not exactly semi-circular in cross section, but somewhat parabolic, so as to exert a slight wedging action upon the fruit for maintaining the same in proper position therein.

Mounted upon the spider arm 9 intermediate the vertically extending portion 17 and the hexagonal portion 8 of the spider structure 7 is a bracket 68 provided with a bearing 69, adapted to receive a shaft 70 provided at its upper end with an index arm 71 fixed thereto and carrying an index roller 72. Keyed to the lower end of the shaft 70 is a bevel gear 73 intermeshing with another bevel gear 74, keyed to the shaft 26. Fixed to shaft 70, and positioned intermediate the index arm 71 and bearing 69 of the bracket 68, is a locking plate 75 (see Figs. 1 and 3). The locking plate 75 is provided with a cut-out portion 76, and is adapted to rotate in unison with the index arm 71, above referred to.

The index plate 52 comprises arcuate faces 77 and elongated radially extending slots 78. During rotation of the index arm 71 in the direction of arrow 79, in Fig. 3, the roller 72 enters one of the elongated slots 78 and causes rotation of the index plate 52 in the direction of the arrow 80, until the arcuate face 77 following said slot is in alignment with the locking plate 75, and locked by the peripheral face of the same against further rotation. At this time, the roller 72 leaves the respective slot 78, and the index plate 52 remains in locked position until the roller 72 enters the next slot 78 of the index plate 52 and causes a further rotation of the same.

It will be observed from Fig. 3 that upon entry of the roller 72 into one of the elongated slots 78 of the index plate 52, the cut-out portion 76 of the locking plate 75 will be in such relation with respect to the index plate 52 that a rotation thereof, as referred to hereinbefore, is permitted.

The elongated slots 78 are disposed in angles of 60 degrees with respect to each other, corresponding to the angular arrangement of the series of fruit receiving cups 59, and the arcuate faces 77 are disposed intermediate the elongated slots 78, as clearly shown in Fig. 3.

In view of the arrangement above described, the index plate 52 as well as the turret A are intermittently rotated, and a corresponding advancement of the fruit holding and supporting cups 59 from the feed mechanism B to the pitting mechanism C, reshaping mechanism D, and ejector F is obtained.

*Feeding, stemming and centering mechanism*

Fixed to the vertically extending portion 17 of the spider arm 9 is a bracket 85 (see Figs. 1 and 5), which is provided with spaced bearings 86 and 87, as clearly shown in Fig. 2. Positioned within the bearings 86 and 87 is a shaft 88, held in fixed relation thereto by means of set screws 89. Mounted upon the shaft 88 and fixed thereto by means of set screws 90 is a U-shaped bracket 91, which carries a top or stem supporting plate 92. The forward end of the top plate 92 extends a slight distance above the turret A and comprises a plurality of rectangular openings 93, which are in alignment with the cups 59 of the turret A when the same are in fruit receiving position. The forward ends of these openings are closed by means of U-shaped members 94, as will be best seen from Figs. 2 and 8. These U-shaped members are secured to the upper surface of the top plate 92 in any convenient manner, and are provided with depending tongue portions 95 (see Figs. 7 and 9) which are of an arcuate contour in vertical direction.

Depending from the lower surface of the top plate 92 are bearing lugs 96, through which a shaft 97 extends in a transverse direction with respect to the top plate 92 and parallel to the fixed shaft 88.

Figures 5, 6:
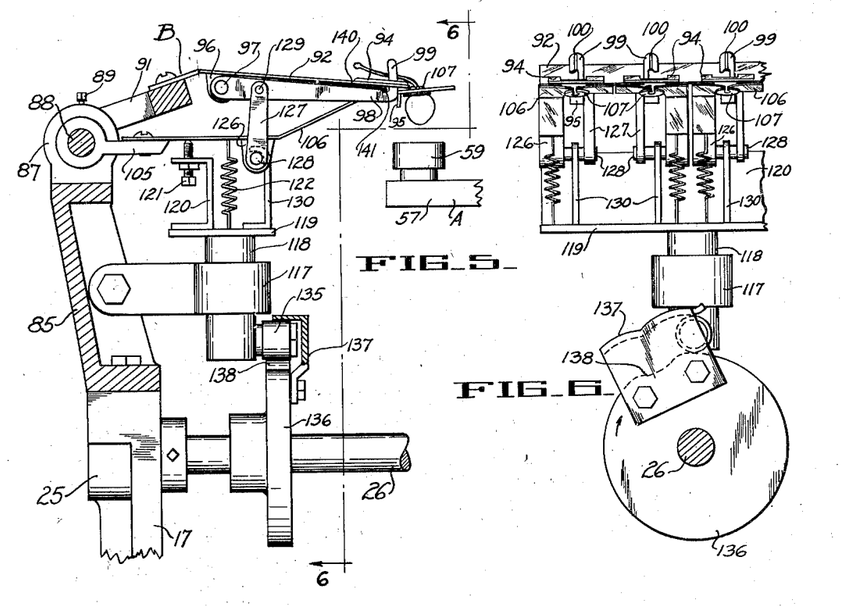
Fig. 5 is a side elevation of the feed mechanism, which includes the stemming mechanism and the fruit centering device, certain parts being shown in section.
Fig. 6 is a side elevation of Fig. 5, certain parts being omitted.

Rotatably mounted upon the shaft 97 are a plurality of locking arms 98, each one of which is provided with an upwardly and transversely extending hook portion 99, extending through the openings 93 in the top plate 92 when the locking arms are in a position as shown in Fig. 5.

The hook portions 99 of the locking arms 98 are in close relation to the depending tongues 95 of the U-shaped members 94. The face of each of these hook portions is circumferential in contour about shaft 97, corresponding to the circumferential contour of the depending tongue portions 95 about the same center. The face of each hook portion is further provided with a groove 100 which extends vertically thereof.

Mounted upon the shaft 88 are a plurality of bearing members 105 which are positioned intermediate the bearing brackets 86 and 87. Each of the bearing members 105 is provided with a stripping plate 106, extending above the cups 59 of the turret A when the same are in fruit receiving position. The free ends of the stripping plates 106 are of a V-shaped configuration and are provided with flanged eyelets 107 (see Figs. 9 and 10), disposed at the apex of the V-portions thereof. The eyelets 107 of the stripping plates 106 are disposed in centered relation with respect to the cups 59 when the same are in fruit receiving position, and are provided with an opening 108 for permitting the insertion of the stem of a cherry therein.

Figures 7, 8, 9, 10:
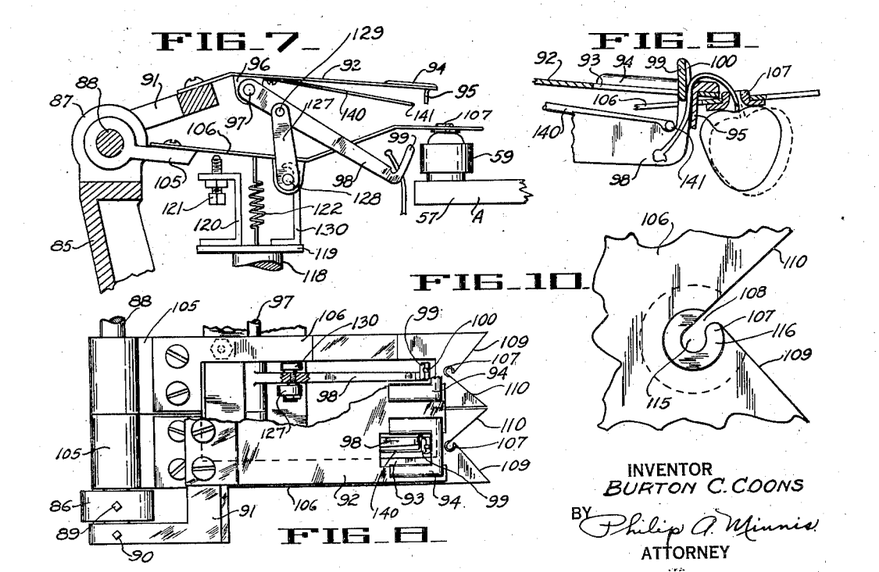
Fig. 7 is a side elevation of the feed mechanism, illustrating the position of the parts thereof during the stemming operation.
Fig. 8 is a plan view of Fig. 5, certain parts being broken away.
Fig. 9 is a sectional view of certain parts of the feed and stemming mechanism, illustrating the stem of a cherry in locked position preparatory to the stemming action.
Fig. 10 is a plan view of one of the centering members of the feed mechanism.

The sides 109 of the V-shaped portions of the stripping plates 106 are tangentially positioned with respect to the outer periphery of the eyelets 107, while the sides 110 of the V-shaped portions of the stripping plates are tangentially arranged with respect to the inner periphery of the eyelets 107, which forms a central opening 115, as will be best seen from Fig. 10. The tangential faces 109 and 110, and the entrance openings 108 of the eyelets 107 of adjacent stripping plates 106, are arranged in reversed position, and the hooks 99 of the locking arms 98 of adjacent stripping plates 106, are arranged in opposite positions with respect to each other.

The portion 116 of the eyelets 107 adjacent the tangential portions 109 of the stripping plates 106 aids materially in keeping the cherry in proper alignment during the centering and stemming operation, in that it prevents the tilting of the cherry during the stemming thereof.

In feeding the machine of the present invention, the operators grasp the stems of two pairs of cherries and pull the same into the V portion of adjacent stripping plates 106. The stems are then bent downwardly under the hook portions 99 of the locking arms 98 into a position as will be clearly seen from Fig. 5. As soon as the stems of the cherries are positioned under the hook portions 99 of the locking arms 98, the fruit will remain suspended as shown in Fig. 5, due to the frictional engagement between the stem and the U-shaped members 94.

Fixed to the bracket 85, previously referred to, is a bearing bracket 117, within which a shaft 118 is slidably disposed. Mounted upon the upper end of the shaft 118 is a plate 119, provided with a channel member 120 extending transversely of the stripping plates 106, and provided with a plurality of set screws 121, one for each stripping plate 106, for adjusting and positioning the stripping plates in fully raised position, as shown in Fig. 5.

Secured to the plate 119 and each one of the stripping plates 106 are coil springs 122, tending to force the stripping plates 106 in a downward direction. Each of the stripping members 106 is provided with a depending bearing bracket 126 and an actuating arm 127, pivotally secured thereto by means of a pivot pin 128. The actuating arms 127 are pivotally attached to the locking arms 98 by means of pivot pins 129.

The plate 119, previously referred to, is further provided with a plurality of vertically extending hooks 130, one for each stripping member; each hook 130 is adapted to engage the pivot pin 128 of the actuating arm 127, with which it cooperates.

The lower end of the shaft 118 carries a roller 135, adapted to ride upon a rotary cam 136, mounted upon the shaft 26. The roller 135 is maintained in proper cooperative relation with the cam 136 by means of a roller guide 137, secured to the rotary cam 136. The cam 136 is provided with a detent 138 and the roller guide 137 functions primarily to insure a positive actuation of the stripping plates 106 while the roller 135 travels over the portion 138 of the cam.

All of the stripping plates and their associated mechanism operate in the same manner and in the following only the operation of one stripping plate 106 and its associated parts is therefore described.

When the parts of the feed mechanism are in the position as shown in Fig. 5, with a cherry suspended thereon in a manner as previously referred to herein, the hook 130 of each stemming unit is almost in engagement with the pivot pin 128 thereof, and the set screw 121 holds the stripping plate 106 in intimate contact with the lower front edge of the top plate 92, while spring 122 is tending to pull the stripping plate 106 in a downward direction.

When the cam portion 138, upon rotation of the cam 136, is opposite the roller 135, the shaft 118 will be pulled downwardly by the action of the roller guide 137, imparting a downward pull upon the stripping plate 106 by means of the hook 130 and pivot pin 128. The resulting downward movement of the stripping plate 106 is sufficient to strip the cherry from the stem.

Upon downward movement of the shaft 118, the set screw 121 is moved out of supporting contact with the stripping plate 106, and the spring 122 pulls the latter in a downward direction the remainder of the distance allotted for its travel.

Since the travel of the hook 130 is less than the travel of the pivot pin 128, the stripping plate 106 may stop at any point in the vicinity of the top of the cup, dependent upon the size of the cherry operated upon.

Incident to the downward movement of the stripping plate 106, the locking arm 98 is also forced downwardly by means of the actuating arm 127, and in view of the fact that the pivot pin 129 of the actuating arm 127 is positioned nearer to the shaft 97 than the pivot pin 128 to the shaft 88, the locking arm 98 will travel a greater distance in a downward direction than the stripping plate 106.

Two results are obtained by the above arrangement, namely, the locking of the stem between the hook portion 99 and the U-shaped member 94 during the stripping of the cherry from the stem, and the ejecting of the stem from the vicinity of the feeding station subsequent to the stripping operation.

Referring now to Fig. 9, it will be noted that due to the faster travel of the locking arm 98 with respect to the stripping plate 106, the stem of the cherry will be squeezed between opposing faces of the hook 99 and tongue 95, so as to cause entering of the stem of the cherry into the groove 100 of the hook portion 99, assuring a retention of the stem in proper position during the stemming operation.

When the stem has been locked in a manner as above described, the downward movement of the stripping plate 106, referred to hereinbefore, will strip the cherry from the stem and place the same into one of the cups 59 positioned thereinbeneath and in alignment therewith. Since the cherry is suspended on the stem, which is locked between the hook portion 99 and the U-shaped member 94 during the stemming operation above described, the downward motion of the stripping plate 106 bearing on top of the cherry will straighten any curvature in the stem, and align the same with respect to the vertical axis of the cup 59, so that a proper positioning and centering of the cherry with respect to the cup 59 is obtained.

It should furthermore be noted that the rate of travel of the stripping plate 106 is greater than the rate of travel of the falling cherry stripped from the stem, so that the fruit will be forced into the cup in proper and accurately centered position, without any possibility of movement thereof relative to the stripping plate during the feeding operation above referred to.

After completion of the stemming operation above described, the continued downward travel of the locking arm 98 releases the stem from its clamped position between the hook portion 99 and the U-shaped member 94, and the hook 99 thereupon forces the stem through the opening 93 of the top plate 92. The stem is thereby removed from the feed mechanism and may be discharged from the machine by means of a chute (not shown) in an obvious manner.

An L-shaped spring 140, mounted to the lower face of each top plate 92, and provided with a transversely extending portion 141, may be preferably employed for dislodging the stem from the locking arm 98 to prevent any possibility of pulling the stem back into the opening 93.

The pitting mechanism

Upon completion of the stemming and centering operation, the cherries deposited in the cups 59 are now advanced toward the pitting station C, where the pitting operation is performed. The pitting mechanism is disclosed in Figs. 11 to 21, inclusive.

Figures 11, 12:
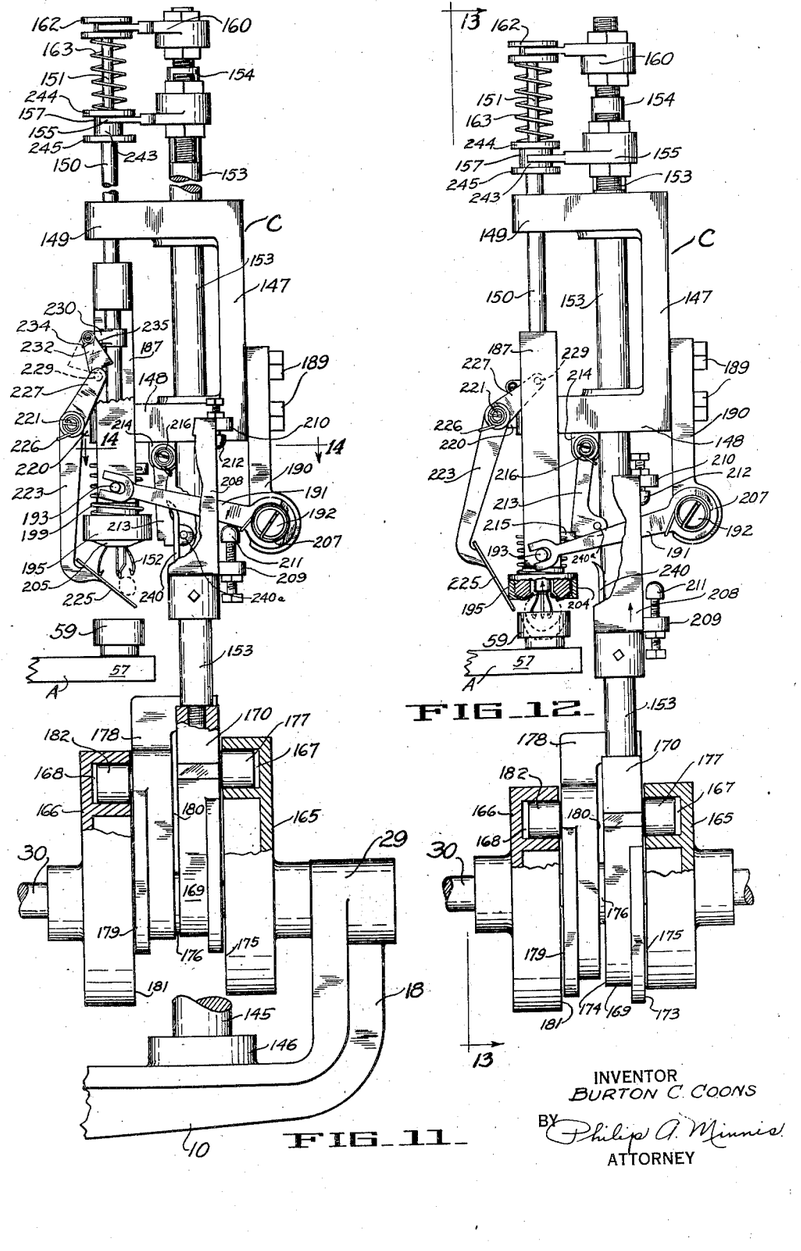
Fig. 11 is a side view of the pitting mechanism illustrating the position of the parts thereof during the pitting operation; certain parts are shown in section, while others are broken away.
Fig. 12 is a side elevation of the pitting mechanism, similar to that shown in Fig. 11, the parts of the pitting mechanism being illustrated in positions which they assume shortly after the pitting operation. Certain parts of this figure are shown in section, and others are broken away.
Figures 13, 14, 16:
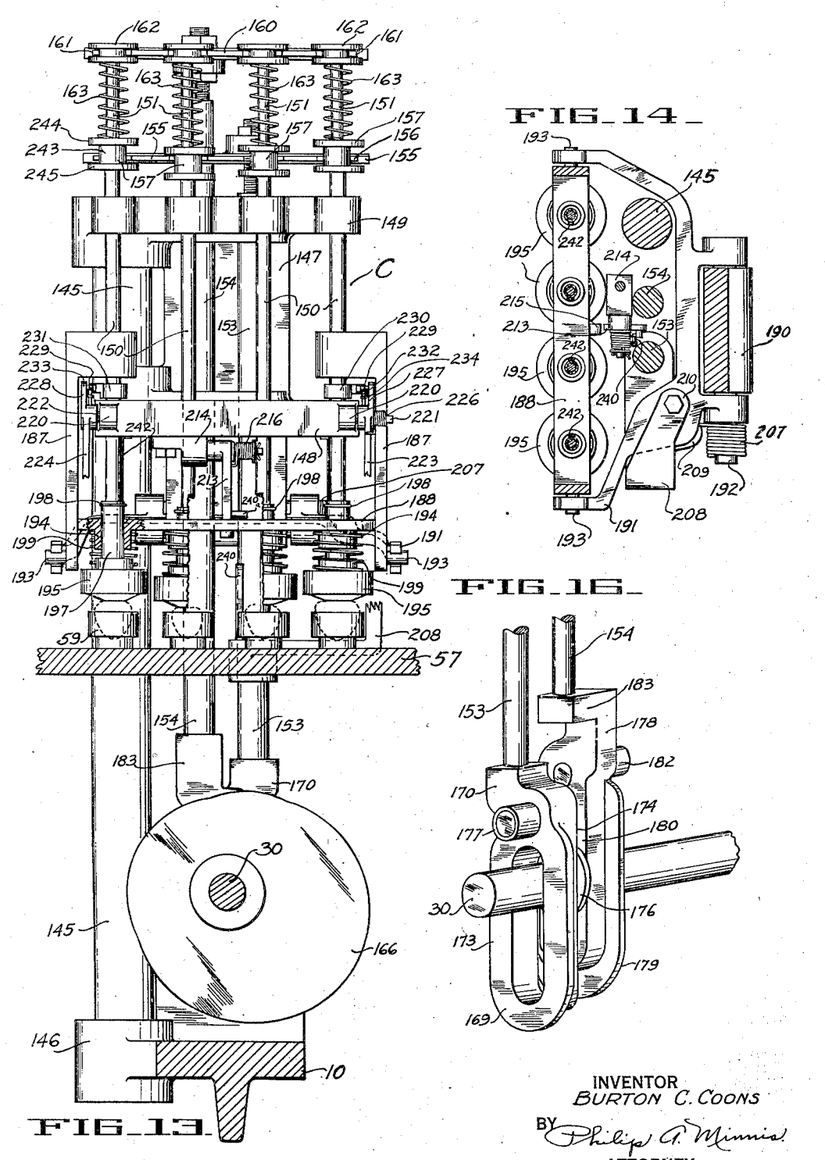
Fig. 13 is a front elevation of the pitting mechanism shown in Fig. 11, the view being taken along lines 13—13 of Fig. 12, certain parts being broken away.
Fig. 14 is a horizontal sectional view taken along lines 14—14 of Fig. 11, illustrating a portion of the pitting mechanism.
Fig. 16 is a perspective view of certain actuating members of the pitting mechanism.

The pitting mechanism is mounted upon the spider arm 10 previously referred to, by means of a standard 145, which is fixed within a boss 146 and extends upwardly in a vertical direction, as will be seen from Figs. 3 and 13. Fixed upon the standard 145, as best seen in Figs. 11, 12, and 13, is a supporting bracket 147, which comprises horizontally extending portions 148 and 149.

Slidably disposed within the horizontally extending portions 148 and 149 of the bracket 147 are a plurality of sleeves 150, which are in axial alignment with each series of cups upon the turret A when the same are in a position adjacent the pitting station. Slidably mounted within each sleeve 150 is a spindle 151. The lower ends of the spindles 151 are provided with a plurality of fingers 152 which project from the lower ends of the sleeves 150.

Slidably arranged within the horizontal portions of the bracket 147 are a sleeve actuating shaft 153 and a spindle actuating shaft 154. The upper end of the sleeve actuating shaft 153 carries an actuating bracket 155, which extends transversely with respect to the bracket 147 and is provided with notches 156 adapted to engage spools 157 secured to the upper ends of the sleeves 150. Upon movement of the shaft 153 and actuating bracket 155 in vertical directions the sleeves 150 will be correspondingly actuated, due to the engagement between the actuating bracket 155 and the spools 157, as will be clearly seen from Fig. 13.

In a similar manner, shaft 154 carries a spindle actuating bracket 160 provided with notches 161 within which spools 162 secured to the upper ends of the spindles 151 are received, so that upon actuation of the shaft 154 in vertical directions, the spindles 151 are operated in a corresponding manner. Interposed between the spools 157 and 162 are coil springs 163 for normally maintaining the sleeves 150 in their lowermost position with respect to the spindles 151.

Fixed upon the shaft 30 are rotary cams 165 and 166 provided with cam ways 167 and 168, respectively. Mounted adjacent the rotary cam 165 and straddling the shaft 30 is an actuating member 169 (see Figs. 11, 12, and 16) provided with a hub portion 170 to which the lower end of the shaft 153 is secured. The actuating member 169 is provided with guide faces 173 and 174 which cooperate with the inner face 175 of the rotary cam 165 and a spacer disc 176 for maintaining the actuating member 169 in proper position. Supported upon the actuating member 169 and adjacent the face 173 thereof is a cam roller 177 which projects into the cam way 167 of the rotary cam 165.

Interposed between the spacer disc 176 and the rotary cam 166 is an actuating member 178 which is secured to the lower end of the shaft 154. The actuating member 178 comprises guide surfaces 179 and 180; the guide surface 179 cooperates with the inner surface 181 of the rotary cam 166, while the guide surface 180 cooperates with the spacer disc 176 previously referred to for maintaining the actuating member 178, which straddles the shaft 30, in proper position. Mounted upon the actuating member 178 adjacent the guide surface 179 is a roller 182 extending into the cam way 168 of the rotary cam 166. The connection between the spindle operating shaft 154 and the actuating member 178 is established by means of a hub portion 183, which is offset in a left hand direction with respect to the shaft 30, while the hub portion 170, which interconnects the sleeve actuating shaft 153 with the actuating member 169, is offset in a right hand direction, as clearly seen from Figs. 13 and 16.

It will therefore be noted from the above that upon rotation of the shaft 30 and the rotary cams 165 and 166, shafts 153 and 154 are shifted in vertical directions to effect a corresponding movement of the spindles 151 and sleeves 150. Furthermore, the cams are so positioned with respect to each other that a relative movement between the spindles and sleeves is obtained for causing opening and closing of the fingers 152 in a manner as will be referred to later on.

Slidably mounted on the outer sleeves 150 are stripper cup supporting brackets 187 provided with a transversely extending stripper bar 188. Fixed to the bracket 147 by means of screws 189, as will be best seen from Figs. 11 and 12, is a yoke-supporting bracket 190 which carries a stripper bar actuating yoke 191 pivoted thereto by means of a pivot shaft 192. The stripper cup supporting brackets 187 are mounted within the yoke structure 191 by means of pins 193.

The stripper bar 188 is provided with a plurality of bearing portions 194 within which the stripper cups 195 are slidably mounted. These stripper cups, as will be best seen from Fig. 17, consist of a body portion 196 provided with an upwardly extending sleeve 197, which is slidably received within the bearings 194 previously referred to. A ring clip 198 prevents removal of the stripper cups from the bar 188. Interposed between the stripper cups 195 and the stripper bar 188 are coil springs 199 for normally holding the cups in their lowermost position with respect to the stripper bar 188.

The stripper cups 195 are provided with a center bore 200 through which the lower ends of the sleeves 150 and spindles 151, which carry the fingers 152 previously mentioned extends. The lower end of the body portion 196 of the stripper cups 195 is of considerable larger diameter than the sleeve portion 197 thereof and is threaded for attachment of a retaining ring 204 for securing a perforated rubber diaphragm 205 to the lower end of the stripper cup. The fingers 152 extend through the perforation of the diaphragm 205, as clearly shown in Fig. 17, and the lower portion of the bore 200 is of enlarged diameter and of conical configuration, as clearly shown at 206.

Interposed between the pivot shaft 192 and yoke 191 is a coil spring 207 adapted to maintain the yoke and stripper bar 188 in raised position.

An L-shaped bracket 208, a detail of which is shown in Fig. 15, is fixed upon the shaft 153 (see Figs. 11, 12, and 14) and is provided with a pair of lugs 209 and 210. The lugs 209 and 210 carry adjustable buttons 211 and 212, respectively. The button 211 is adapted to raise the yoke 191 upon upward movement of the shaft 153, while upon downward movement of the same the button 212 effects the lowering of the yoke 191. A trigger 213 pivotally mounted upon a lug 214 depending from the horizontal portion 148 of the bracket 147 is adapted to engage a lug 215 extending from the stripper bar 188, and a spring 216 interposed between the lug 214 and trigger 213 is adapted to urge the same into locking engagement with the stripper bar. The locking of the stripper bar 188 by means of the trigger 213 is effected when the locking bar is in its lowermost position, as shown in Fig. 12.

Pivotally disposed within bearings 220 (see Figs. 11, 12, and 13) of the horizontal portion 148 of the main bracket 147 and positioned adjacent the outer sleeves 150 by means of pivot pins 221 and 222 are bell cranks 223 and 224 provided with a transversely extending table 225 mounted in an inclined position with respect to the fingers 152, as shown in Figs. 1 and 11. Interposed between the pivot pin 221 and bell crank 223 is a coil spring 226 for normally maintaining bell cranks 223 and 224 and table 225 in a position as shown in Fig. 11. The upper lever arm portions 227 and 228 of the bell cranks 223 and 224 are provided with inwardly extending bell crank actuating pins 229. Pivotally mounted upon collars 230 and 231 are throw-out cams 232 and 233. The throw-out cams 232 and 233 are normally held in a position as shown in full lines in Fig. 11, by means of springs 234 interposed between the cams 232 and 233 and collars 230 and 231. Pins 235 secured to the collars 230 and 231 are adapted for limiting the movement of the throw-out cams 232 and 233 in an inward direction.

When the parts are in position as shown in Fig. 11, the pins 229 are in engagement with the cam surface of the throw-out cams 232 and 233, and upon downward movement of the sleeves 150 the bell cranks 223 and 224 will be rotated around their pivot pins 221 and 222 and the table 225 will be moved from a position as shown in Fig. 11 to a position as illustrated in Fig. 12.

Due to the fact that the pins 229, which are carried by the bell cranks, are shifted relatively with respect to the throw-out cams upon the pivotal movement of the bell cranks 223 and 224, the same will disengage from the throw-out cams 232 and 233, and the table 225 will engage the lower end of the stripper cups 195 and will be held thereby in a position as shown in Fig. 12. As soon as the stripper cups rise, spring 226 will force the table 225 inwardly to a position below the fingers 152, as clearly shown in Fig. 11. This returns the table to its normal position, and the actuating cycle of the table 225 may be repeated in the same manner as described above, upon subsequent downward movement of the sleeves 150.

A trip member 240 is secured to the bracket 208 and is adapted to release the trigger 213 from locking engagement with the stripping bar 188 previously referred to.

Figure 17:
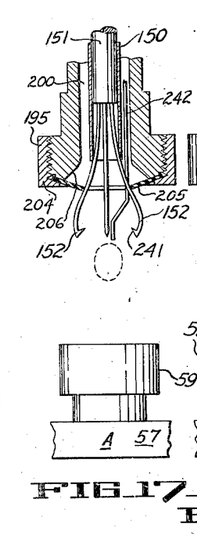
Figs. 17 to 21 are fragmentary illustrations of the operation of the pitting member at various stages during the pitting action thereof.

Referring now more specifically to the construction of the pitting fingers 152, it will be noted that the same are mounted on the lower ends of the spindles 151 in a manner as shown in Fig. 17. The fingers 152 are made of spring steel and are normally held in an open position due to their inherent resiliency. The lower end of each pitting finger 152 is provided with an upwardly extending hook portion 241. Upon downward movement of the sleeves 150, with respect to the spindles 151, the sleeves 150 slide over the upper finger portions and force the fingers to closed position, as illustrated in Fig. 20. Spring fingers 242 positioned intermediate the sleeves 150 and stripper cups 195 and supported by the horizontally extending portion 148 of the main bracket 147, extending downwardly from the cups and between the opened fingers 152 (see Fig. 17) for dislodging the pits from the fingers 152 after completion of the pitting operation. During the pitting operation and upon movement of the sleeves 150 from the position shown in Fig. 17 to the position as illustrated in Fig. 20, the spring fingers 242 are moved out of cooperation with the fingers 152 by means of sleeves 150, as will be clearly seen from the illustrations above referred to.

Referring now to Figs. 17 to 21, it will be noted that the opening and closing of the fingers is controlled by the movement of the sleeves 150 with the respect to the spindles 151. In Fig. 17, the fingers are shown in fully opened position, while in Fig. 20 they are shown in their closed position during the pitting operation. The fingers 152 are sharpened at their lower ends, so that the same cut through the skin and into the meat of the cherry during the pitting operation without mutilation of the fruit.

During the operation of the pitting mechanism upon rotation of the rotary cams 165 and 166, the sleeves 150 and spindles 151 are moved downwardly from their position as shown in Figs. 11 and 17 toward the cups 59 within which the centered and accurately positioned cherries are supported.

The configuration of the cam ways 167 and 168 of the rotary cams 165 and 166, respectively, is such that the sleeves 150 travel faster than the spindles 151 and fingers 152 until they assume a position as shown in Fig. 18. This movement of the sleeves 150 with respect to the fingers 152 causes closing of the same and retracts the lower end of the spring fingers 242, which remain stationary, from between the fingers 152 while the latter approach the stem end of the fruits. In this way the finger opening is reduced to a minimum previous to the entrance of the pitting fingers into the fruits.

Upon further rotation of the cams 165 and 166 the sleeves 150 and spindles 151 travel downwardly at the same rate and the fingers 152 enter the fruits by cutting the skin and meat of the cherries in radial directions at the stem ends thereof substantially to the center of the fruits.

Shortly after entrance of the fingers 152 into the fruits and upon further downward travel of the fingers 152 while the same approach the pits of the fruit, the downward travel of the sleeves 150 is retarded due to the configuration of the cam way 167, so that the fingers 152 will advance with respect to the sleeves 150 and will open in view of their inherent resiliency, thereby passing over the pits while they cut further downward into the fruit. This phase in the operation of the pitting fingers is shown in Fig. 19.

When the fingers have reached their lowermost point of travel, the sleeves 150 move downwardly from the position shown in Fig. 19 to the position shown in Fig. 20, and the pitting fingers 152 close over the pits.

The spools 157 of the sleeves 150 comprise a cylindrical portion 243 provided with an upper flange 244 and a lower flange 245. The cylindrical portions 243 are received within the notches 156 of the actuating bracket 155 and are vertically movable with respect to the same. The distance of movement is limited by the flanges 244 and 245, and normally the spools are held in their lowermost position with the flange 244 thereof bearing against the actuating bracket 155 due to the action of the springs 163.

In other words, the spools are floatingly supported within the actuating bracket 155 and may move relative to the spindles 151 against the tension of the springs 163 independent of the movement of the actuating bracket 155 caused by the action of the rotary cam 165. In view of the fact that the spools 157 are fixed to the upper ends of the sleeves 150, the latter may perform a corresponding floating movement therewith relative to the spindles 151.

Proceeding now with the operation of the pitting mechanism, it will be noticed that when the fingers 152 close upon the pits of the fruits, excessive pressure exerted by the fingers 152 upon the pits and bending of the fingers is prevented as the sleeves 150 may float upwardly and permit an automatic adjustment of the fingers in closed position in correspondence with the size of the pits to be removed from the fruit. A jamming of the sleeve upon the fingers and a deformation of the fingers when they close upon a large pit is effectively prevented. The above provision enables handling of various sizes of cherries and eliminates the grading thereof preparatory to processing of the same in the machine of the present invention.

Incident to the downward movement of the sleeves 150 from the position shown in Fig. 17 to a position as disclosed in Fig. 20, the throw-out cams 232 and 233 engage pins 229 of the bell cranks 223 and 224 and effect a partial rotation of the latter, thereby moving the pit deflecting table 225 out of the way of the fingers 152 and pitting cups 195 to a position as shown in Fig. 12.

During the downward movement of the shaft 153, causing the downward movement of the actuating bracket 155 and sleeves 150, and incident to the movement of the sleeves 150 from the position in Fig. 19 to the position as illustrated in Fig. 20, the button 212 engages yoke 191 and forces the same downwardly against the pressure of the spring 207, the button 211 being out of engagement with yoke 191. The stripper cups are thereby moved downwardly and positioned upon the cherries with the diaphragms 205 flexed back to a position as shown in Fig. 20. The individual stripper cups 195, which are floatingly supported on the stripper bar 188, may adjust themselves automatically, with respect to the bar 188, against the pressure of the springs 199, depending upon the size of the cherry in each one of the cups 59 adjacent the same. The trigger 213 automatically locks the bar 188 in its lowermost position.

Cams 165 and 166 cause, upon their further rotation, an upward movement of the spindles 151, fingers 152, and sleeves 150, without relative movement between these parts.

The cherries gripped by the pitting fingers 152 closed upon the pits are lifted out of the cups 59 and the stripper cups 195 move upward against the pressure of the springs 199 until the portions 196 of the stripper cups abut against the bearings 194, arresting further upward movement thereof. With the stripper cups now held in their uppermost position, the upward movement of the pitting fingers 152 continues, and the pits (see Fig. 21) are pulled from the fruits through the incisions made in the meat and skin thereof. The radial incisions in the skin and meat portion of the cherries permit upward and outward bending of the skin and meat of the fruits above the pits, and the pits are extracted with a minimum of disfiguration of the fruits at the stem end thereof. As soon as the pits are dislodged from the meat of the fruits the stripper cups 195 under the action of springs 199 snap the pitted cherries back into the cups 59 at a speed greater than the free gravitative fall of the fruits, so that the same are returned to the cups 59 without disturbing their centered relation with respect thereto.

With the pits removed and held between the pitting fingers 152, the spindles 151 and sleeves 150 return to their original positions, as shown in Fig. 17. During this travel, the sleeves 150 move relative to the spindles 151 and fingers 152, and the latter open due to the inherent resiliency thereof. At the same time, the spring fingers 242 enter between the fingers 152 and dislodge the pits therefrom.

Incident to the above described return of the sleeves to normal position, the trip member 240 engages a pin 240ª on the trigger 213 and shifts the same out of engagement with bar 188, and spring 207 returns the yoke 191, bracket 187, bar 188, and the stripper cups 195 to their full line positions as shown in Fig. 11. The button 211 finally engages the yoke, holds the same in raised position and functions also to return the yoke 191 in case of failure of spring 207. The pit deflector plate 225 under the action of spring 226 moves underneath the fingers 152 and deflects the falling pits away from the cups 59 preferably into a pit discharge chute, not shown. All of the parts of the pitting mechanism are now in a position as shown in Fig. 11, and the cycle of operation repeats.

The reshaping mechanism

Figure 22:
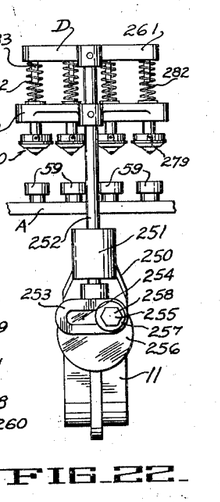
Fig. 22 is an end elevation of the reshaping mechanism.

After the completion of the pitting operation the turret A is rotated by the indexing mechanism thereof, and the cups 59 with the pitted cherries are presented to the reshaping mechanism generally indicated at D, as best seen in Figs. 1 and 22.

This reshaping mechanism is adapted to close the wound formed in the stem end of the cherries by the extraction of the pits. The meat and skin of the cherries bent outwardly during the extraction of the pit has a tendency to assume its original position; however, a definite reshaping and closing of the stem end of the fruit is necessary to obtain a final product which is satisfactory in every respect.

The reshaping mechanism, as best seen in Figs. 1 and 22 to 25, is carried by a bracket 250 secured to the spider arm 11 previously referred to. This bracket comprises a bearing portion 251 within which a vertical shaft 252 is slidably mounted. The lower end of the shaft 252 is provided with a crank bearing 253 having a horizontally extending elongated slot 254 within which a crank pin 255 of a disc crank 256 mounted on the shaft 38 is received, so that upon rotation of the shaft 38 a reciprocating movement of shaft 252 is obtained. A washer 257 interposed between the disc crank 256 and a head 258 of the crank pin 255 is adapted to maintain the crank pin in proper engagement with the crank bearing 253 and the elongated slot 254 thereof.

Fixed to the upper portion of the shaft 252 is a supporting bracket 259, within which reshaping or tucking elements 260 are slidably mounted, and a spring guide and stop bracket 261, as best seen from Figs. 1 and 22.

The supporting bracket 259 and the spring guide and stop bracket 261 extend above the turret A in such a manner that the tucking elements 260 are supported in alignment with the cups 59 adjacent the same when these cups are in a proper indexed position for the reshaping operation.

The reshaping elements 260 consist of a cylindrical body portion 265, slidably mounted within the supporting bracket 259, and a flange 266 for retaining the reshaping elements on said bracket.

The lower end of each reshaping element 260 is provided with a cylindrical reshaping finger 267 of reduced diameter comprising a dome-shaped end 268 having a knob-like protuberance 269 at the lower center thereof.

Each reshaping element 260 is further provided with a collar 270 adjustably secured thereto by means of a clamp screw 271. The collar 270 is recessed at the lower end thereof as shown at 272 and includes a frusto conical surface 273 to which a frusto conical flexible rubber diaphragm 276 having a central opening 277 is attached by means of a clamping ring 278 held in position by screws 279.

Figure 23:
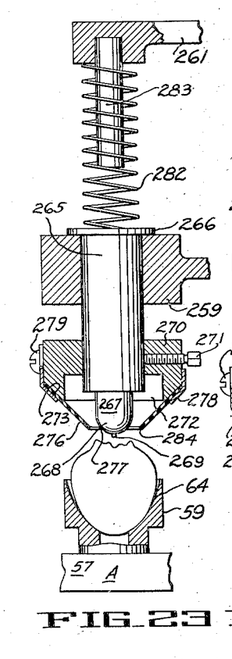
Fig. 23 is a vertical section through one of the reshaping members and its associated parts of the reshaping mechanism, the reshaping member being shown in inoperative position.
Figure 24:
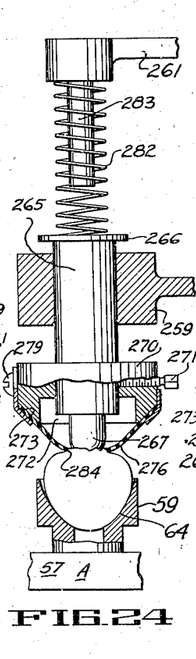
Figs. 24 and 25 are vertical sectional views of a reshaping member and its associated parts, illustrating the same in different operative positions in engagement with a cherry to be reshaped thereby. Certain portions of Figs. 24 and 25 are shown in elevation.

The lower end of each reshaping finger 267 extends through the opening 277 of the frusto conical diaphragm 276 as will be best seen from Fig. 23. The collar 270 may be adjusted with respect to the reshaping finger 267 in any desired manner to vary the position of the diaphragm in accordance with the requirements of practice depending upon the size and configuration of the fruit to be reshaped thereby.

The spring guide and stop bracket 261 is positioned above the supporting bracket 259 in alignment therewith, and interposed between the reshaping elements 260 and the bracket 261 are coiled springs 282 which are held in position on the bracket 261 by means of spring guides 283. The lower ends of the coil springs 282 extend into a bore (not shown) in the members 265 so that the lower ends of the springs are held in proper position.

When the turret A is indexed so as to position a series of cups 59 and the pitted cherries therein below the reshaping mechanism, the crank pin 255 travels through its upper arc of rotation during the continuous rotation of the shaft 38 and no substantial downward movement of the reshaping elements is effected, as will be seen from Fig. 22. However, after the turret indexing operation is completed and while the turret remains stationary the crank pin 255 travels through its lower arc causing downward movement of shaft 252 and the reshaping elements 260 carried thereby. Due to the fact that these reshaping elements 260 are accurately centered with respect to the cups 59 now positioned therebeneath, the reshaping fingers 267 will engage the stem end of the cherries and press the dislocated skin and meat back into the center of the fruit, reshaping the same thereby to its original configuration. The small knob 269 engages that section of the fruit formerly joined to the stem and reshapes the small cavity of the cherries at this point.

Figure 25:
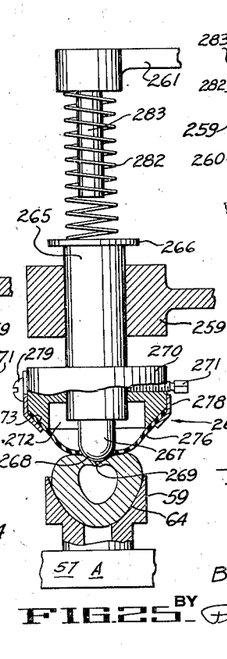

During this reshaping action, each reshaping finger 267 descends upon the stem end of the fruit beneath the same, and the lower edge of the frusto conical diaphragm 276 adjacent the opening 277 engages the stem end of the fruit and flexes the diaphragm from the position of Fig. 23 to the position as illustrated in Fig. 25. The diameter of the opening 277 is thereby reduced due to the contraction of the rubber under the flexing action. Therefore, while the annular edge 284 of the diaphragm opening 277 contracts and shifts toward the vertical axis of the reshaping finger 267 during its frictional engagement with the stem end of the fruit, the dislocated skin and meat of the fruit is shifted toward the center of the fruit (see Fig. 24) and is subsequently tucked back into the fruit by the finger 267 and knob 269. (See Fig. 25). The opening caused by the extraction of the pit at the stem end of the fruit is closed and the stem end of the cherry is reshaped to its natural appearance by the combined action of the flexible diaphragm 276, reshaping finger 267, and knob 269, as above described.

Cherries are rather fragile fruits and the pressure exerted by the fingers 267 must be within predetermined limits. This pressure is regulated by the springs 282 which are so calibrated that the pressure exerted upon the fruits does not damage the same. Therefore, under the predetermined pressure of the spring 282 the reshaping elements 260 may individually float up or down within the supporting bracket 259 to permit individual reshaping of each fruit under such predetermined pressure irrespective of the size of the fruit. In this way, a crushing of large fruits, which project farther above the cups than small cherries, is prevented and likewise an insufficient reshaping operation upon small cherries and a lack of reshaping pressure is effectively prevented.

After completion of the reshaping operation, the turret is rotated by the index mechanism to present the cups containing the pitted and reshaped cherries to the ejector mechanism, which will now be specifically described.

*Ejector mechanism*

The ejector mechanism for discharging the pitted fruits from the cups 59 is illustrated in Figs. 1 and 3 and comprises a plurality of reciprocating ejector members 290, one for each cup of a series thereof, which are slidably mounted within the supporting bracket 20 attached to the hexagonal body portion 8 of the spider structure 7 below the turret A of the machine. The ejector members 290 are rigidly secured to a cross bar 292 to which one end of an actuating arm 293 (see Fig. 3), fulcrumed at 294 to bracket 20, is slidably and pivotally attached by means of rollers 295 operating in a roller slide of the cross bar 292, comprising channel members 296 and 297. The other end 298 of the actuating arm 293 carries a roller (not shown) operating within a camway 299 of a rotary cam 300 keyed to shaft 38.

The camway 299 of the rotary cam 300 is of such configuration as to cause an upward and downward motion of the ejector members when a series of cups 59 is positioned above the ejector members and in proper alignment therewith after each indexing operation of the turret A and while the latter remains stationary for a short interval during its intermittent rotation.

During such reciprocation the ejector members 290 enter the cups 59 through bore 63 thereof from below the turret A and travel upward therein to a sufficient distance to lift the pitted fruits out of the cups and to discharge the same therefrom.

The upper end of each ejector member comprises an inclined surface 301 which effects the discharge of the fruits toward one side of the cups, preferably toward the periphery of the turret A into a discharge chute, not shown.

Operation

In the following a résumé of the complete operation of the entire machine will be given wherein the function of all of its parts will be set forth in proper sequence and timed relation.

During the operation of the machine of the present invention the main shaft 26 and shafts 30, 38 and 70 are continuously driven by the motor 4. Therefore, the feed mechanism B, pitting mechanism C, reshaping mechanism D and ejector mechanism F are operated continuously in successive cycles while the turret A is intermittently rotated in timed relation with respect thereto.

In describing the operation of the machine, the travel of a single row of fruits from the feed mechanism to the ejector mechanism will be followed. However, it should be understood that during the operation of the machine successive rows of fruit are continuously supplied to the same and travel successively from the feed mechanism past the pitting and reshaping mechanism to the ejector mechanism where they are discharged from the machine.

When, during the operation of the machine, the group of fruit holding and supporting cups designated 305 is in a position as shown in Fig. 2, and the stripping plates 106 and locking arms 98 are in their uppermost position as illustrated in Fig. 5, the feed mechanism B is in fruit receiving position. The operators now insert four cherries into the feed mechanism B by entering the stems of the fruits into the V-shaped portions of the stripping plates 106 and into the central openings 115 of the eyelets 107 thereof. The stems of the fruit are thereupon bent downwardly by the operators and engaged with the hook portions 99 of the locking arms 98 in a manner as previously referred to herein and illustrated in Fig. 5.

The cherries are now suspended from the feed mechanism and are held thereon by the frictional engagement of the stems with the hooks 99 and the U-shaped members 94, and the operators may reach for additional cherries to be inserted in the feed mechanism after the feeding and stemming operation now under consideration has been completed and the feed mechanism is again in fruit receiving position.

After placing of the cherries in the feed mechanism as illustrated in Fig. 5, the hooks 130 are almost in engagement with the pivot pins 128. The set screws 121 retain the stripping plates 106 in contact with the lower front edge of the top plate 92, and the springs 122 tend to pull the stripping plates 106 in a downward direction. As soon as the roller 135 enters the depressed cam portion 138 of cam 136 during the continuous rotation of the latter, the shaft 118 is pulled in a downward direction, disengaging the set screws 121 from the stripping plates 106 which are now forced downwardly by the springs 122 above referred to.

Incident to the downward movement of the stripping plates 106 the locking arms 98 are forced downwardly, and travel a greater distance than the stripping plates 106.

During the downward movement of the locking arms 98 the stems of the fruit are momentarily clamped between the hook portions 99 and the U-shaped members 94, so that the stems of the fruits are held securely in position when the stripping plates 106 move downward under the action of the springs 122 (see Fig. 9). During the downward movement of the stripping plates 106 the cherries are centered, stripped from the stems, and placed in the cups 59 of the series of cups 305, which have been advanced previous to the stemming operation of the feed mechanism by rotation of the turret A and are now positioned at 306 below the stripping plates 106 and in alignment therewith (see Fig. 7).

As soon as the roller 135 has passed the depressed cam portion 138 the locking arms 98 and stripping plates 106 are returned to their original position as shown in Fig. 5, and the feed mechanism is thereby moved to fruit receiving position and conditioned for the next feeding and stemming operation.

During the above described downward movement of the locking arms 98 and subsequent to the stripping of the cherries, the stems are pulled downwardly through the openings 93 in the top plate 92. Upon return movement of the locking arms 98 the same strike against the L-shaped springs 140 mounted below the top plate 92, and any stems adhering or sticking to the hook portions 99 are thereby dislodged and drop from the vicinity of the feed mechanism into a discharge chute directing the same outwardly of the machine.

The centering of the cherries during th stemming operation with respect to the fruit holding cups 59 has ben specifically described previously herein and a repetition thereof at this point is not believed to be necessary.

With the cherries now placed in the fruit holding cups in accurately centered position, the index mechanism of the turret A is operated and effects a forward movement of the series of cups 305 from the position 306 to the position 307, as shown in Fig. 2. While these cups are in this position, no operation is performed upon the fruit. In other words, the cup position 307 is only a blank stop to provide sufficient space between the pitting mechanism and the feed mechanism to enable the operators to conveniently feed the cherries to the latter.

The turret A is again rotated by the index mechanism and the group of fruit holding cups under consideration are positioned below the pitting mechanism C, as shown at 308 in Fig. 2.

During the advancement of the cups from the position 307 to the position 308 the downward movement of the sleeves 150 and spindles 151 of the pitting mechanism from the position shown in Fig. 17 toward the position shown in Fig. 18 begins. The throw-out cams 232 and 233 engage the pins 229, and the pit deflecting table 225 is swung away from below the pitting fingers 152 to permit the positioning of the cups and fruits thereunderneath.

During the downward movement of the sleeves 150 and spindles 151, the sleeves travel faster than the spindles 151, effecting closing of the pitting fingers 152. The spring fingers 242 are shifted away from the pitting fingers and the parts are now in a position as shown in Fig. 18.

Upon further downward movement of the parts of the pitting mechanism, and while the turret A is at rest, the pitting fingers enter into the cherries until they approximately contact the pits thereof.

The downward movement of the sleeves 150 and spindles 151, as above described, is effected by the operation of the cams 165 and 166 in a manner as specifically described previously herein.

When the lower ends of the pitting fingers 152 are in approximate contact with the pits of the fruits and while the downward movement of the pitting fingers 152, spindles 151, and sleeves 150 continues the cams 165 and 166 effect a relative movement between the spindles 151 and sleeves 150, so that the rate of travel of the spindles 151 is greater than that of the sleeves 150. The relative motion between these parts produces an opening of the pitting fingers to permit the same to pass over the pit. When the spindles 151 have reached their lowermost position, the same remain stationary while the sleeves 150 continue their downward travel, closing the pitting fingers and locking the same over the pit.

During the opening of the pitting fingers as above described, the stripper cups 195 are lowered from the position shown in Fig. 19 to the position as illustrated in Fig. 20. The rubber diaphragms 205 engage the stem ends of the fruits and are flexed into a position as shown in Fig. 20. The cherries are now securely held between the cups 59 and stripper cups 195. As previously stated, the stripper cups are floatingly mounted within the stripper bracket 188 so as to engage cherries of various size without damage thereof.

During the further operation of the machine the spindles 151, pitting fingers 152, and sleeves 150 are moved upwardly and with the pitting fingers firmly grasping the pits the fruits are lifted out of the cups 59 while the stripper cups 195 move upward against the tension of the springs 199. When the stripper cup portions 196 abut against the bearings 194, the stripper cups 195 are held stationary, the pits are pulled out of the fruit through the incision in the stem end thereof, and the stripper cups 195 return to their position as shown in Fig. 21 under the influence of the springs 199, snapping the cherries back into the cups, thereby maintaining the same in centered position with respect to the cups.

In other words, when the stripper cups 195 are raised above the fruit-holding and supporting cups 59 and the pits have been extracted, the cherries do not fall back into the cups on account of their own gravity but are rather forced back into the same by the stripper cups ahead of the gravity action to thereby prevent a disalignment of the cherries with respect to the cups 59.

During the pitting operation above described, the stripper bar 188 is locked in its lowermost position, as shown in Fig. 12, by means of the latch 213. However, the stripper cups may move slightly in an upward direction against the tension of the springs 199, as above described. Upon completion of the pitting operation the spindles 151, stripper fingers 152, and sleeves 150 continue their upward movement, and at the same time latch 213 is disengaged from the stripper bar 188, permitting the return of the stripper cups 195 to their original position as shown in Fig. 17 under the influence of the spring 207 and yoke 191. During the return movement of the stripper cups and pitting fingers to the position as shown in Fig. 17, the pit deflecting table 225 swings below the pitting fingers 152 (see Fig. 11) so that when the same now open due to relative movement of the sleeves 150 with respect to the spindles 151 and the pits are released from the spring fingers 152, the same are deflected away from the cups 59 and may fall into a chute for discharging the same from the machine. During the relative motion of the spindles 151 and sleeves 150 above referred to, causing opening of the pitting fingers 152, the spring fingers 242 enter between the pitting fingers and dislodge the pits from the same in case they should stick thereto and not readily discharge due to their own gravity.

This completes the pitting operation and the turret A is now rotated by the index mechanism to present the pitted fruits to the reshaping mechanism D. The cups are now in a position as indicated at 309 in Fig. 2.

During the last indexing operation of the turret A above referred to, i. e., during the movement of the cups 59 from the pitting mechanism to the reshaping mechanism, the crank pin 255 (see Fig. 22) of the reshaping mechanism moves through its upper arc of rotation, causing a slight upward and downward movement of the reshaping mechanism D. When the cups and fruits are properly aligned below the reshaping mechanism and the indexing of the turret A has been completed, the crank pin 255 travels through its lower arc of movement, causing a downward movement of the reshaping mechanism D and subsequently an upward movement thereof to return the same to its original position as shown in Fig. 22.

During the downward movement of the reshaping mechanism, the reshaping elements 260 and the diaphragms 276 thereof engage the stem end of the fruits. The flexing and contraction of the flexible diaphragms 276 during their frictional engagement with the stem end of the fruits contracts the meat and skin portions displaced during the pitting operation toward the stem axis of the fruits into the path of the tucking members 267 and protuberances 269 (see Fig. 24). The downward movement of the tucking members 267 and protuberances 269 presses the displaced skin and meat portions back into their original position, and reshapes the stem end of the fruits (see Fig. 25).

The pressure under which the reshaping elements 260 operate is always constant and corresponds to the pressure of the coil springs 282. During the reshaping action the reshaping elements may individually float in an upward direction in accordance with the size of the individual fruits operated upon. In this way, damage of the fruits is prevented and the tucking elements will perform their reshaping operation in a satisfactory manner irrespective of the size of the fruits.

Upon completion of the reshaping operation above referred to the turret A is again rotated to align the cups 59 in a proper position above the ejector mechanism F. This ejector mechanism is operated by the cam 300 in a manner as previously described. The configuration of the camway 299 of the cam 300 and its position with respect to the shaft 38 is such that the ejector mechanism remains stationary during movement of the turret A and is operated when the turret is at rest. When the cups 59 are properly positioned above the ejector mechanism F the same is shifted upwardly and the ejector members 290 enter into the cups 59 from below the turret A through the openings 63 and discharge the fruits.

Thereupon the ejector mechanism F is returned to its original position as shown in Fig. 1 in which it remains until operated again to effect the discharge of the next row of fruits.

This completes the entire cycle of operation of the machine, which repeats in respect to each row of fruits traveling through the machine in the same manner as stated above.

While I have shown and described a preferred apparatus and a preferred method for carrying out my invention, it will be understood that both are capable of variation and modification, while still employing the principles of my invention. It is to be understood, therefore, that the scope of the invention should be limited only by the scope and proper interpretation of the claims appended hereto.

Having now described my invention and in what manner the same may be used, what I claim as new and desire to protect by Letters Patent is:

1. In a fruit pitting machine, in combination, a rotatable turret, fruit supporting cups carried on said turret, stem gripping means for holding the fruit presented thereto in suspended position above said fruit supporting cups, a stripping plate positioned in alignment with said cups for engaging the stem end portion of the suspended fruit, actuating means for moving the stripping plate toward said supporting cups for stripping the fruit from the stem and for placing the fruit into said cups, means cooperating with said cups for pitting the fruit, means cooperating with said cups for reshaping the pitted fruit, and means for intermittently rotating the turret for advancing the cups from the stripping plate into alignment with said pitting and reshaping means and in timed relation with respect thereto.

2. In a fruit pitting machine, fruit holding means, a stationary support, pit extracting means slidably mounted on the support, a stripper bar slidably mounted on the pit extracting means, a stripper cup carried by the stripper bar, means for moving the stripper bar with respect to the pit extracting means for engaging the stripper cup with the fruit presented thereto by said fruit holding means, means for operating the pit extracting means for extracting the pit from the fruit, and means for locking the stripper bar in operative position for maintaining the stripping cup in engagement with the fruit during the pit extracting operation.

3. In a fruit pitting machine, fruit holding means, a stationary support, a pit extracting means slidably mounted on the support, a stripper bar slidably mounted on the pit extracting means, a stripper cup carried by the stripper bar, means for moving the stripper bar with respect to the pit extracting means for engaging the stripper cup with the fruit presented thereto by said fruit holding means, means for operating the pit extracting means for extracting the pit from the fruit, means for locking the stripper bar in operative position for maintaining the stripping cup in engagement with the fruit during the pit extracting operation, means for releasing the stripper bar upon completion of the pit extracting operation, and means for returning the stripper bar to its original position for disengaging the stripper cup from the pitted fruit.

4. In a pitting device for fruit pitting machines, stationary means, pit extracting means movably mounted on said stationary means, a stripper bar movably mounted on said pit extracting means, a stripper cup movably supported on said bar, and means for operating the pit extracting means and means for gripping the pit of fruit presented thereto and for extracting the pit therefrom including means for moving the stripper bar relative to said pit extracting means for engaging the stripper cup with the fruit presented thereto for holding the same during the extraction of the pit.

5. In a pitting device for fruit pitting machines, stationary means, pit extracting means movably mounted on said stationary means, a stripper bar movably mounted on said pit extracting means, a stripper cup movably supported on said bar, means for operating the pit extracting means for gripping the pit of the fruit presented thereto and for extracting the pit therefrom including means for moving the bar relative to said pit extracting means for engaging the cup with the fruit to be pitted and for holding the same during the extraction of the pit, means for locking the bar and cup in fruit holding position, means for unlocking said bar and cup upon completion of the pit extraction, and automatic means for returning said bar and cup to their original position.

6. In a pitting device for fruit pitting machines, a stripper cup having a dished portion and a central passage, a flexible frusto conical annular diaphragm mounted within said cup to normally extend outwardly with respect to the dish portion thereof, pit extracting means cooperating with said cup and diaphragm movably mounted within the central passage of said cup, means for urging said stripper cup toward the fruit to be pitted and for flexing the diaphragm inwardly to receive a portion of the fruit within said cup, means for operating the pit extracting means for grasping the pit of the fruit and for pulling the same from the fruit while the latter is held within said stripper cup, and means for releasing the stripper cup for movement away from the fruit whereby the diaphragm flexes to its original position for discharging the fruit from said cup.

7. In a pitting device for fruit pitting machines, stationary means, pitting means movably mounted on the stationary means, stripper means, means for movably mounting the stripper means on the pitting means, pit deflecting means pivotally mounted on the stationary means, means for operating the pitting means, means for engaging the stripper means with the fruit for holding the same during the operation of the pitting means, means cooperating with the pitting means for moving the pit deflecting means into inoperative position, and means for moving the pit deflecting means into operative position upon completion of the operation of the pitting means.

8. In a pitting device for fruit pitting machines, stationary means, pitting means movably mounted on the stationary means, stripper means, means for movably mounting the stripper means on the pitting means, pit deflecting means pivotally mounted on the stationary means, means for operating the pitting means, means for engaging the stripper means with the fruit for holding the same during the operation of the pitting means, and means cooperating with the pitting means for moving the pit deflecting means into operative and inoperative position in timed relation with respect to the operation of the pitting means.

9. In a reshaping device for fruit pitting machines, means for contracting the meat of the fruit displaced in the region of the wound left by removal of the pit, and means operable with the contracting means for pressing the contracted meat back into the interior of the fruit.

10. In a reshaping device for fruit pitters, a flexible conical sleeve engageable with the meat of the fruit for contracting the same in the region of the wound left by removal of the pit, and means movable axially relative to said sleeve for pressing the contracted meat back into the interior of the fruit.

11. In a reshaping device for fruit pitters, a flexible frusto conical open-ended diaphragm engageable with the meat of the fruit for contracting the same in the region of the wound left by removal of the pit, and means axially arranged relative to said diaphragm for pressing the contracted meat back into the interior of the fruit.

12. In a reshaping device for fruit pitting machines, means for contracting the meat of the fruit displaced in the region of the wound left by removal of the pit, and means relatively movable to said contracting means for pressing the contracted meat back into the interior of the fruit.

13. In a reshaping device for fruit pitting machines, means for contracting the meat of the fruit displaced in the region of the wound left by removal of the pit, and semi-spherical means coacting with the means for contracting the meat for engaging the meat contracted by the latter for pressing the contracted meat back into the interior of the fruit.

14. In a reshaping device for fruit pitting machines, means for contracting the meat of the fruit displaced in the region of the wound left by removal of the pit, and semi-spherical means having a knob-like protuberance movable with the last named means for engaging the contracted meat and for pressing the contracted meat back into the interior of the fruit.

15. In a reshaping mechanism for fruit pitting machines, a reshaping element comprising a conical flexible sleeve and a tucking member centrally positioned with respect to the same, and means for operating said reshaping element for engaging the sleeve with the fruit in the region of the wound left by removal of the pit for contracting dislocated meat portions of the fruit toward the stem axis of the fruit and for engaging the tucking member with the contracted meat for pressing the same back into the interior of the fruit.

16. In a reshaping mechanism for fruit pitting machines, a reshaping element comprising a conical flexible sleeve and a tucking member centrally positioned with respect to the same, means for operating said reshaping element for engaging the sleeve with the fruit in the region of the wound left by removal of the pit for contracting dislocated meat portions of the fruit toward the stem axis of the fruit and for engaging the tucking member with the contracted meat for pressing the same back into the interior of the fruit, and means for controlling the pressure of said reshaping element against the fruit.

17. In a reshaping mechanism for fruit pitting machines, a reshaping element comprising a conical flexible sleeve and a tucking member positioned within the same, actuating means for pressing said reshaping element against the fruit in the region of the wound left by removal of the pit for shifting dislocated portions of the meat of the fruit toward the stem axis thereof and for tucking said portions back into the fruit, and resilient means interposed between the reshaping element and said actuating means for controlling the pressure of the reshaping element against the fruit.

18. In a fruit pitting machine, a reshaping means, fruit holding means for presenting fruit to said reshaping means, actuating means for the reshaping means for pressing the latter against the fruit within said holding means, and resilient means interposed between the reshaping means and said actuating means for permitting relative movement of the reshaping means with respect to the actuating means.

19. In a fruit pitting machine, a reshaping means, fruit holding means for presenting fruit to said reshaping means, actuating means for the reshaping means for pressing the latter against the fruit in the region of the wound left by removal of the pit, and resilient means interposed between the reshaping means and said actuating means for maintaining a predetermined pressure between the reshaping means and said fruit and for permitting relative movement of the reshaping means with respect to the actuating means.

20. In a fruit reshaping device for fruit pitting machines including a fruit support, conically arrayed resilient means adapted to be axially aligned with the fruit support to expose the fruit carried thereby to the restricted area of said conically arrayed resilient means, means for moving the resilient means toward the fruit support for engaging the fruit therein in the region of said fruit surrounding the wound left by removal of the pit to resiliently urge the meat surrounding said wound over the latter, and a tucker member axially arranged with respect to the resilient means for movement therewith for engaging the meat urged over the wound and for pressing said meat back into the interior of the fruit.

21. In a fruit pitter, fruit holding means, means cooperating with the fruit holding means for removing the pit from the fruit, a reciprocable resilient means cooperating with the fruit holding means for engaging the meat of the fruit around the opening therein through which the pit was removed to urge the meat over the opening, means movable with said resilient means for engaging the meat urged over the opening and for closing said opening to restore the original appearance of the fruit, and means for reciprocating said resilient means toward and away from the fruit.

22. A fruit pitting machine embodying a fruit holder, a pitting mechanism for removing the pit from a fruit in said holder, a reciprocable reshaping element having a dome shaped protuberance the convex face of which is operable to engage and replace torn portions of the fruit in the wound left by removal of the pit, and means for operating the holder to successively present the fruit held therein to said pitting mechanism and reshaping element.

23. In a fruit pitting machine, in combination, a rotatable turret, fruit supporting cups carried on said turret, stem gripping means for holding the fruit presented thereto in suspended position above said fruit supporting cups, a stripping plate positioned in alignment with said cups for engaging the stem end portion of the suspended fruit, actuating means for moving the stripping plate toward said supporting cups for stripping the fruit from the stem and for placing the fruit into said cups, and means for intermittently rotating the turret in timed relation with respect to the operation of said stripping plate.

24. In a pitting device for fruit pitting machines, a stripper cup normally held out of engagement with the fruit to be pitted and having a central passage terminating in an inverted dish portion, a flexible frusto conical annular diaphragm mounted within said cup and normally extending outwardly of the dish portion thereof and adapted to flex inwardly relative to said dish portion when a portion of fruit is urged into said cup, means for reciprocating said stripper cup for engaging the diaphragm with the fruit to be pitted and for flexing the same inwardly to receive a portion of the fruit within said cup, pit extracting means movably mounted within the central passage of the cup and cooperating with the latter for grasping the pit of the fruit and for pulling the same from the fruit while the latter is held within said stripper cup, said diaphragm reflexing under its inherent resiliency for removing the pitted fruit from the stripper cup when the latter returns to normal position.

25. In a fruit pitter, fruit holding means, means cooperating therewith for removing the pit from the fruit, tucker means cooperating with the holding means for closing the opening in the fruit through which the pit was removed, and means movable with respect to said last named means and cooperating therewith for contracting the meat and skin portions of the fruit displaced during the pitting operation into the path of the tucker means for restoring the original appearance of the fruit.

26. In a reshaping device for fruit pitters, a flexible conical sleeve engageable with the meat of the fruit for contracting the same in the region of the wound left by removal of the pit, and semispherical means having a knob-like protuberance concentric relative to the sleeve for engaging the meat while it is contracted as aforesaid whereby to press the contracted meat back into the interior of the fruit for restoring the original appearance thereof.

27. In a fruit pitting machine, a reciprocating fruit reshaping means adapted to apply first a circumferential and thereafter an axial pressure in respect to the opening formed by the removal of the pit from the fruit, fruit holding means for presenting fruit to said reshaping means, actuating means for reciprocating the reshaping means toward and away from the fruit to press said reshaping means against the fruit, and yieldable means between said actuating and reshaping means for maintaining a predetermined pressure between the reshaping means and said fruit during the reciprocation of the reshaping means irrespective of the size of the fruit.

28. The method of treating fruit which comprises removing the pit from the fruit, contracting the meat of the fruit in the region of the wound left by the removal of the pit, by circumferential pressure directed toward the wound, and forcing the contracted meat back into the interior of the fruit by pressure exerted axially of the wound for restoring the original appearance of the same.

29. The method of pitting and reshaping the pitted fruit which comprises removing the pit from the fruit, folding the meat surrounding the opening through which the pit is removed back toward said opening by a circumferential pressure exerted towards the axis of the opening simultaneously throughout the periphery of the opening, and then tucking said meat into the opening to close said opening and seal the pocket previously occupied by the pit in the fruit.

30. The method of treating pitted fruit which comprises applying circumferential contracting pressure against torn meat surrounding the wound left by the removal of the pit and in a direction towards the axis of the wound to contract the torn meat back over the wound, and then applying pressure against the contracted meat in a direction axially of the wound to press the contracted meat back into the wound for restoring the original appearance of the fruit.

31. The method of treating fruit pitted through its stem cavity which comprises contracting the meat of the fruit back over the wound left by the removal of the pit, by applying circumferential pressure directed towards the axis of the wound, and then pressing the contracted meat back into the interior of the fruit by pressure directed towards the center of the fruit for restoring the appearance of the stem cavity of the same.

BURTON C. COONS.